United States Patent [19]
Taylor et al.

[11] Patent Number: 5,727,020
[45] Date of Patent: Mar. 10, 1998

[54] WIRELESS RADIO MODEM WITH MINIMAL INTERDEVICE RF INTERFERENCE

[75] Inventors: Bryan Taylor; Mihal Lazaridis, both of Waterloo; Peter Edmonson, Hamilton; Perry Jarmuszewski, Guelph; Lizhong Zhu, Waterloo; Steven Carkner, Waterloo; Matthias Wandel, Waterloo, all of Canada

[73] Assignee: Research In Motion Limited, Waterloo, Canada

[21] Appl. No.: 747,874

[22] Filed: Nov. 13, 1996

Related U.S. Application Data

[62] Division of Ser. No. 337,841, Nov. 14, 1994, Pat. No. 5,169,531.

[51] Int. Cl.⁶ .................... H04L 5/14; H04B 1/16
[52] U.S. Cl. .................... 375/222; 455/343; 375/316
[58] Field of Search .................... 375/222, 316; 455/343; 395/750

[56] References Cited

U.S. PATENT DOCUMENTS

| | | |
|---|---|---|
| 4,418,320 | 11/1983 | Guyton . |
| 4,630,314 | 12/1986 | Smith . |
| 4,646,329 | 2/1987 | Backef, Jr. et al. . |
| 4,665,519 | 5/1987 | Kirchner et al. . |
| 4,682,344 | 7/1987 | Somer . |
| 4,893,347 | 1/1990 | Eastmond et al. . |
| 4,951,309 | 8/1990 | Gross et al. ............ 379/98 |
| 4,987,571 | 1/1991 | Haymond et al. . |
| 5,020,093 | 5/1991 | Pireh . |
| 5,138,328 | 8/1992 | Zibrik et al. . |
| 5,230,094 | 7/1993 | Kitching et al. . |
| 5,231,647 | 7/1993 | Deguchi . |
| 5,313,211 | 5/1994 | Tokuda . |
| 5,317,707 | 5/1994 | Wallace . |
| 5,347,304 | 9/1994 | Moura et al. . |
| 5,428,790 | 6/1995 | Harper et al. ............ 395/750 |
| 5,444,737 | 8/1995 | Cripps et al. . |
| 5,555,287 | 9/1996 | Gulick et al. ............ 379/61 |

FOREIGN PATENT DOCUMENTS

| | | |
|---|---|---|
| 0416423 | 3/1991 | European Pat. Off. . |
| 0494696 | 7/1992 | European Pat. Off. . |
| 0531100 | 3/1993 | European Pat. Off. . |

(List continued on next page.)

OTHER PUBLICATIONS

"Surface Transverse Wave Based FM Modulator/Demodulator", Reprinted from Electronics Letters 15th Mar. 1990 vol. 26 No. 6 pp. 364–365.
"A Surface Transverse Wave–Based MSK System", Ivan D. Avramov, P.J. Edmonson, Member, IEEE, Peter M. Smith, Member, IEEE IEEE Transactions On Ultrasonics, Ferroelectrics, And Frequency Control vol. 38, No. 3, May 1991.
Product Note 11729B–1, Phase Noise Characterization Of Microwave Oscillators, Phase Detector Method, Hewlett Packard, Aug. 1983.
Electronic Design, vol. 41, No. 16, 5 Aug. 1993, pp. 45–50, Leonard 'PCMCIA–sized radio links portable WLan terminals', see figure 2.
IEICE Transactions on Communications, vol. E76–B, No. 8, Aug. 1993, pp. 990–995, Takehara 'A SAW–based spread spectrum wireless LAN system', see figures 2, 3, 7.

*Primary Examiner*—Tesfaldet Bocure
*Attorney, Agent, or Firm*—Jones, Day, Reavis & Pogue; Charles B. Meyer, Esq.

[57] ABSTRACT

A wireless radio modem for incorporation into a host system includes radio frequency modulation/demodulation circuitry employing electronic device elements that operate in a frequency range that minimize the RF interference between the radio modem and the host system. Radio modem power conservation is further maximized by 1) simplifying signal modulation processing by use of a single sideband suppressed carrier waveform transition table, thereby reducing processing requirements; and 2) incorporating a "sleep mode" feature in which all non-timer circuitry is powered-down when not in use.

1 Claim, 5 Drawing Sheets

FOREIGN PATENT DOCUMENTS

| | | |
|---|---|---|
| 0584872 | 3/1994 | European Pat. Off. . |
| 0599632 | 6/1994 | European Pat. Off. . |
| 0631398 | 12/1994 | European Pat. Off. . |
| 62-292005 | 12/1987 | Japan . |
| 930577 | 5/1982 | U.S.S.R. . |
| 2261345 | 5/1993 | United Kingdom . |

WIRELESS RADIO MODEM WITH MINIMAL INTERDEVICE RF INTERFERENCE

This application is a division of U.S. Ser. No. 08/337,841, Nov. 14, 1994, which issued as U.S. Pat. No. 5,169,531 on Apr. 8, 1997.

TECHNICAL FIELD OF THE INVENTION

This invention relates generally to data communication at radio frequencies in a wireless environment and, in particular, to a method and device that can be imbedded within a host data processing unit for enabling the host data processing unit to transmit data to and receive data from a communication network wirelessly so that the RF interference between the host unit and the radio modem is minimized.

BACKGROUND OF THE INVENTION

Wireless radio modems are used to permit remotely located commuters to communicate with other computers, usually as part of a computer network. Over the past several years a number of efforts have been undertaken to reduce the size, weight, power consumption and portability of radio modems in order to increase their attractiveness to both the technical community and the consuming public. In spite of advances in technology, most state of the art radio modem designs usually involve a flexible cable connection to the host commuter and a bulky external battery pack to supply the necessary power. Previous attempts to incorporate a radio modem within a host computer system have resulted in extremely poor operating performance from the interference caused by electrical noise generated by the host computer.

SUMMARY OF THE INVENTION

The present invention has utility in allowing a host data processing unit to communicate with a wireless network. The present invention is a wireless radio modem that is designed to be located within a host data processing unit so that the host data processing unit can communicate with other data processing units via a wireless data network. The wireless data network uses packet-switched communication. In the preferred embodiment, the radio modem communicates with a data network using the Mobitex™ wireless network protocol. The radio modem design allows different network protocols to be supported by software changes only (i.e., with no substantive hardware modifications), so the scope of the invention is not limited to any specific protocol.

The radio modem is preferably designed to be built into the host data processing unit, although the design may be incorporated into a standalone modem separate from the host data processing unit. The size and performance of the present invention represent a significant improvement over the state of the art.

The radio modem hardware and software are carefully designed to minimize power consumption. At the core of the radio modem is a microprocessor that provides overall control of the operation of the various subsystems of the radio modem. To reduce power consumption significantly, the microprocessor and other key power-consuming components are powered-down when they are not needed and are activated only when data that the radio modem is to process are detected or when a predetermined period time has elapsed from the point the components have been powered down, or put into a "sleep" mode. In addition to the power management circuitry, the method of operation of the radio modem was optimized to reduce power consumption using low-power components and power-efficient design where possible.

Operational performance is also enhanced over the state of the art because the radio modem is designed to operate in the high electrical noise environment present within a data processing unit. The major electrical noise immunity strategy is the use of circuitry designed to operate outside the electrically noisy frequency bands that are present within an operating data processing unit. Among the features that enable the modem to avoid the RF interference of its host data processing unit is the implementation of frequency discrimination at an intermediate frequency (at or above 10.7 MHz) that is well above the noise frequencies emanating from the operation of the host data processing unit.

In order to generate the intermediate frequency at which discrimination takes place, the receiver circuitry uses a single intermediate frequency downconversion. In the preferred embodiment, the intermediate frequency is 45 MHz. After the down-converted signal is channel filtered, it is then demodulated and digitized. The resulting digitized signal is then conveyed to a digital signal processor, where the data is recovered and conveyed to the host data processing unit.

On the transmission side, the transmitter circuitry accepts data from the host data processing unit, via the digital signal processor, in the form of in-phase and quadrature phase components. The signal is modulated directly, using quadrature modulation, and is amplified, upconverted, and then amplified again before being conveyed, via a transmit/receive switch, to an antenna for propagation. For efficiency purposes and to reduce the processing time required to modulate the signal (and thus the processing power required), a look-up table is employed as a part of the modulation process to provide precalculated modulated waveform segments that take into account the interrelationship of a four bit transmission stream on the waveform shade associated with the second bit of the four bit stream.

Accordingly, it is an object of the invention to provide a radio modem with modulation/demodulation means that incorporates circuit elements that operate at frequencies outside the frequency range of the RF noise associated with the host data processing system in which the radio modem is installed.

It is a another object of the invention to provide a radio modem in which frequency discrimination occurs at a data discrimination frequency of 10.7 MHz or higher.

It is a further object of the invention to perform FM frequency discrimination through the use of one or more piezoelectric phase-shift devices, such as surface acoustic wave filters or crystal filters such that the frequency discrimination takes place outside the RF noise frequencies generated by the host data processing unit associated with the radio modem.

It is a yet further object of the invention to provide a stored waveform transition table as part of the digital signal processing circuitry to minimize processing time and power consumption during the digital signal processing phase of the operation of the radio modem.

It is another object of the invention to provide circuitry for minimizing power consumption in a radio modem that permits the major power-consuming components of the radio modem to enter into an inactive state and to be later activated by the detection of data communications or by the expiration of a predetermined period of time, whichever occurs first.

These objects as well as others appreciated by those of ordinary skill in the art will become apparent from the detailed description and in reference to the drawings that follow. The specific examples that are set forth in the detailed description of the preferred embodiment should be understood to be given for illustrative purposes only and are not intended to limit the spirit and scope of the invention.

DESCRIPTION OF THE PREFERRED EMBODIMENTS

The preferred embodiment of the present invention is a radio modem that can be built into the host data processing unit. The radio modem generally comprises transmission/reception means and a modulation/demodulation means.

Figure 1:
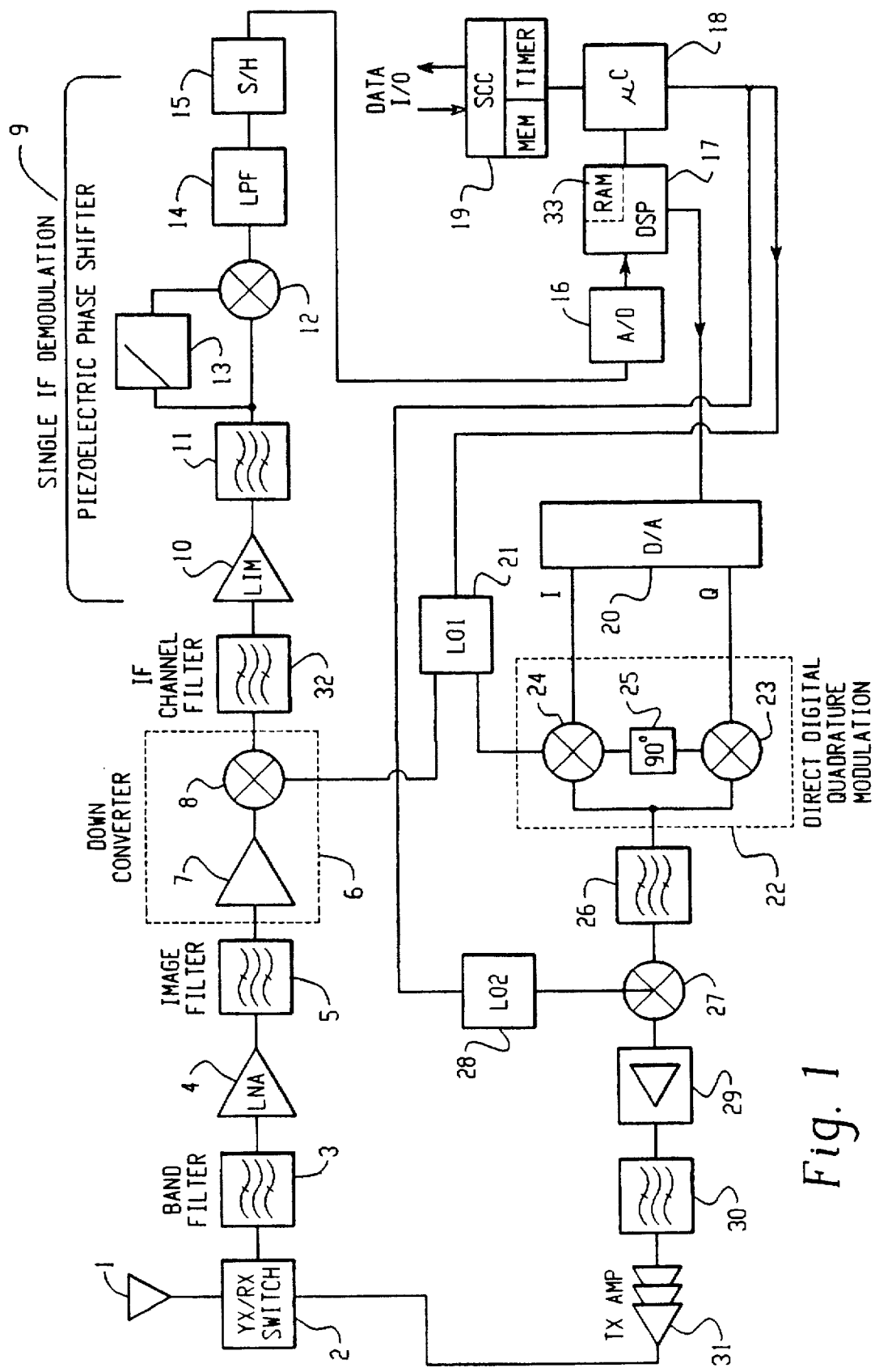
FIG. 1 is a block diagram of the hardware layout for the radio modem.

With reference to FIG. 1, the received signal is conveyed from an antenna (1) via a transmit/receive switch (2) to a band filter (3), which, in the preferred embodiment, is a electronically-coupled piezoelectric device such as an acoustic wave device. The filtered signal is conveyed to a low-noise amplifier (4) and image filter (5), and to the downconverter (6). within the downconverter, the signal amplified by a limiter (7) is mixed with a signal from a local oscillator (21) at the mixer (8) to produce a signal at an intermediate frequency greater than or equal to 10.7 MHz whereupon it is conditioned by the intermediate frequency channel filter (32). The resulting intermediate frequency signal is demodulated with the discriminator (9). In the preferred embodiment, the intermediate frequency is 45 MHz.

The discriminator consists of a limiting amplifier (10) to produce a signal having constant amplitude. This signal is passed through a filter (11) is split into two parts that are mixed in a mixer (12), with one of the parts shifted in phase relative to the other. The phase shift element (13) is preferably an electronically-coupled piezoelectric device such as surface acoustic wave filter or a crystal filter. The demodulated signal is conditioned by a low-pass filter (14) and converted to a digital representation before being conveyed to a digital signal processor (17). The digital signal processor (17) is preferably an ADSP-2171KST-133. The conversion to a digital representation is performed by a sample-and-hold circuit (15), and an analog-to-digital converter (16). The digital data is conveyed to the host data processing device via the microcontroller (18), preferably an Intel SB80L188EB-8, and a serial communications controller (19), preferably a Phillips SCC 9291. One of ordinary skill in the art will appreciate that each of the aforementioned components for which particular part numbers are not referenced are well known in the art.

When the radio modem is transmitting, the data to be sent is conveyed from a host data processing unit, via the serial communications controller (19) and the microcontroller (18) to the digital signal processor (17). The digital signal processor (17) generates the appropriate in-phase and quadrature-phase modulated waveform segments, which are based on the current and previous bits to be sent, from a precalculated look-up table stored in the associated random-access memory (33). The software associated with the generation and manipulation of the look-up table data is attached in source code form as an appendix hereto. The digital signals are converted to analog signals by the digital-to-analog converter (20) and are conveyed to the quadrature modulator (22). Within the quadrature modulator (22) the in-phase signal is mixed in a mixer (24) with the signal from the local oscillator (21), and the quadrature-phase signal is mixed in a mixer (23) with a ninety-degree phase shifted signal from the local oscillator (21) supplied via the phase shift element (25). The emerging modulated signal is passed through a band-pass filter (26), and input to an upconverter mixer (27), where it is mixed with a signal from the local oscillator (28). The upconverted signal is conditioned by a band-pass filter (30) and is amplified in a three-stage power amplifier (31) and is transmitted from the antenna (1) via the transmit/receive switch (2). An alternate embodiment does not incorporate the upconversion stage affected by the local oscillator (28) and the mixer (27).

In greater detail, and again with reference to FIG. 1, the frequency-modulation discriminator (9) employs a electronically coupled piezoelectric phase-shift element (13), such as a crystal filter. This is an improvement over the prior art due to the fact that electronically coupled piezoelectric phase-shift devices have a steeper phase slope relative to changing frequency compared to the tank circuits that have been used in the prior art for frequency discrimination. One advantage of the present innovation is that the discriminator can be operated at higher intermediate frequencies, which is of particular importance to this invention, and is discussed in greater detail below. A second advantage is that the steeper phase slope associated with an electronically-coupled phase-shift element makes the resulting discriminator more sensitive, thereby increasing the sensitivity and receiver performance of the radio modem. The use of a frequency modulation discriminator employing an electronically tuned phase-shift element is not limited to use within a radio modem. Such means can be used to discriminate any frequency modulated signal in other systems as well. In addition, as one of ordinary skill in the art will appreciate, because of the close relationship between frequency modulation and phase modulation, the frequency modulation discriminator disclosed means could also be used with minor modifications to discriminate a phase modulated signal.

As discussed in the preceding paragraph, the discriminator disclosed in the present invention is capable of operating with superior performance at higher frequencies than known discriminator designs. An integral part of the innovation for the present invention is preclusion of electrical interference from the host data processing device, such as "software noise", which is a characteristic emission from any running computer. Typically, such noise is detected at frequencies less than 10.7 MHz. In the present invention, the received signal is downconverted in a single stage to an intermediate frequency that is above the aforementioned threshold frequency of 10.7 MHz, such as 45 MHz. By this method, the radio modem achieves greater noise immunity over known devices, permitting the radio modem to be integrated within a host data processing device without compromising performance of the radio modem.

Again with reference to FIG. 1, the in-phase and quadrature-phase modulated waveform segments are generated by the digital signal processor (17). The waveform segments are based on the current bit, previous bit and bits to be sent, from a precalculated look-up table stored in the associated random-access memory (33). The operation of this method is described below.

Figure 5A:
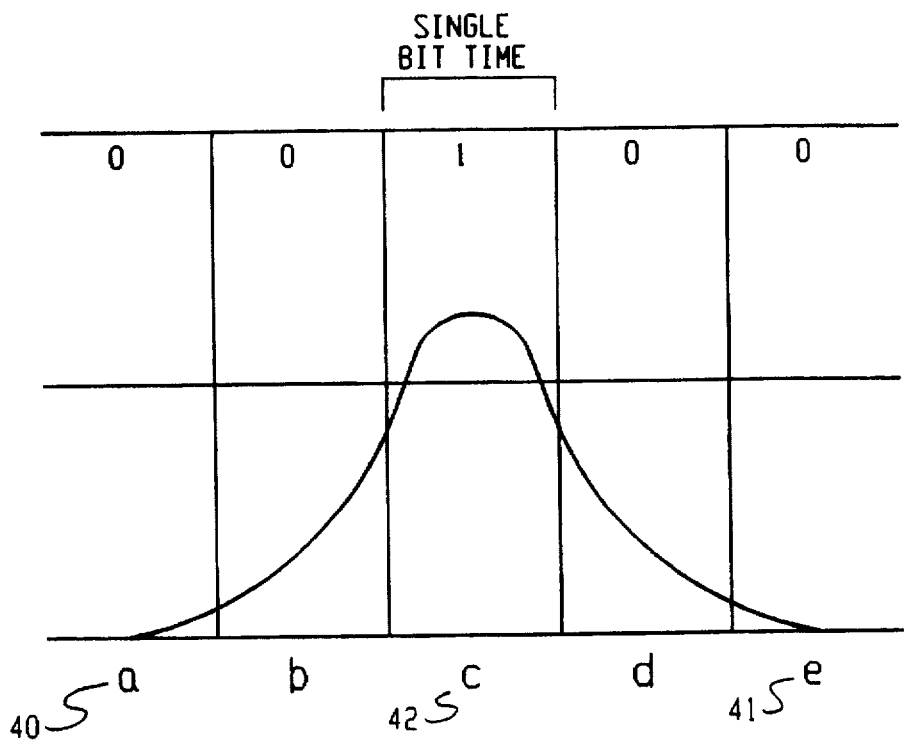
FIGS. 5a and 5b relate to the operation of the pre-modulated waveform segment lookup table.
Figure 5B:
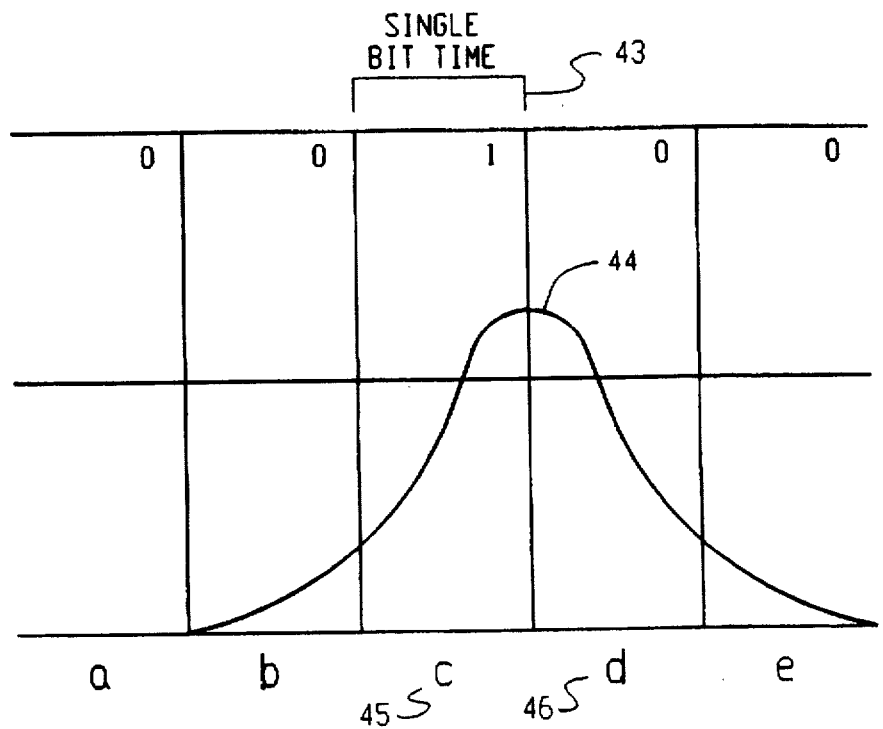

Precalculated waveforms can be used to eliminate the need to execute complicated formulae at run time. In the case of Gaussian Minimum Phase Shift Keying, as is specified under the Mobitex™ standard, with a bandwidth time product of 0.3, the actual waveform used to identify a bit is in excess of three bit periods long, as is shown in FIG. 5a, for the bit sequence 00100. With reference to FIG. 5a, the bit period a (40) and bit period e (41) are affected by the bit in period c (42). Therefore, to store all possible shapes for any bit period c (42), thirty-two different segments would be necessary to represent all possible values for the five bit periods shown. By realizing that the significant portion of the Gaussian shape is only four bit periods long, and shifting the waveform by half of one bit, the number of table entries can be reduced by half to sixteen. The segments now represent one interbit period (43), as shown in FIG. 5b. With reference to FIG. 5b, the bit center (44) is positioned between the bit period c (45) and the bit period d (46). Therefore the value of segment c (45) is only affected by the values of four bits, and therefore has only sixteen possible shapes.

The method described above yields baseband, but not in-phase and quadrature-phase signals. These signals are readily calculated from the tabulated data described above, using the approach that follows. The in-phase and quadrature-phase signals depend on the initial phase at the beginning of the bit period. This initial phase must be known when the tables are calculated. In the Mobitex™ system, the modulation is such that the frequency difference between a stream continuous 1s and a stream of continuous 0s is an even fraction of the bit rate, the starting phase can only take one of several values. For example, in Mobitex™, the frequency deviation is 2000 Hz and the baudrate is 8000 bits/second. Thus a 1 transmitted previously will cause a phase shift of 90 degrees, whereas a zero transmitted previously will cause a phase shift of −90 degrees. Thus there are four multiples of 90 degree phase shifts, or four distinct starting phases for each wave segment for a given surrounding four bits. The rotation of a Cartesian vector by steps of 90 degrees is a simple operation and can be easily performed at run time. Thus no additional precomputed samples are required to allow the different starting phases at the beginning of each bit period. In particular, no further trigonometric calculations or look-up tables are required.

The present invention also employs innovative power management means and methods, in order to minimize power consumption. The major components of the power management circuit are the serial communications controller (19), incorporating an integrated timer and memory, and microprocessor (18), as shown in FIG. 1.

Through implementation of the power management means, the radio modem circuitry consumes approximately half the power of other known systems. In general, maximum power savings in any situation are accomplished by simply shutting the device off. The microprocessor (18) has the ability to shut itself off such that it consumes virtually no power. The circuit has been implemented such that the processor can also shut down other circuitry that is not in use. The processor is brought back to active mode by activating reset or providing an external non-maskable interrupt signal.

The present invention utilizes a system that allows the processor to shut down most of the circuitry, but remains able to power-up on one of two conditions, namely, that either a pre-determined time had elapsed, or that the host system attempts to communicate. Both of these conditions are problematic, requiring non-obvious solutions, which are as follows:

Timer System

Figure 2:
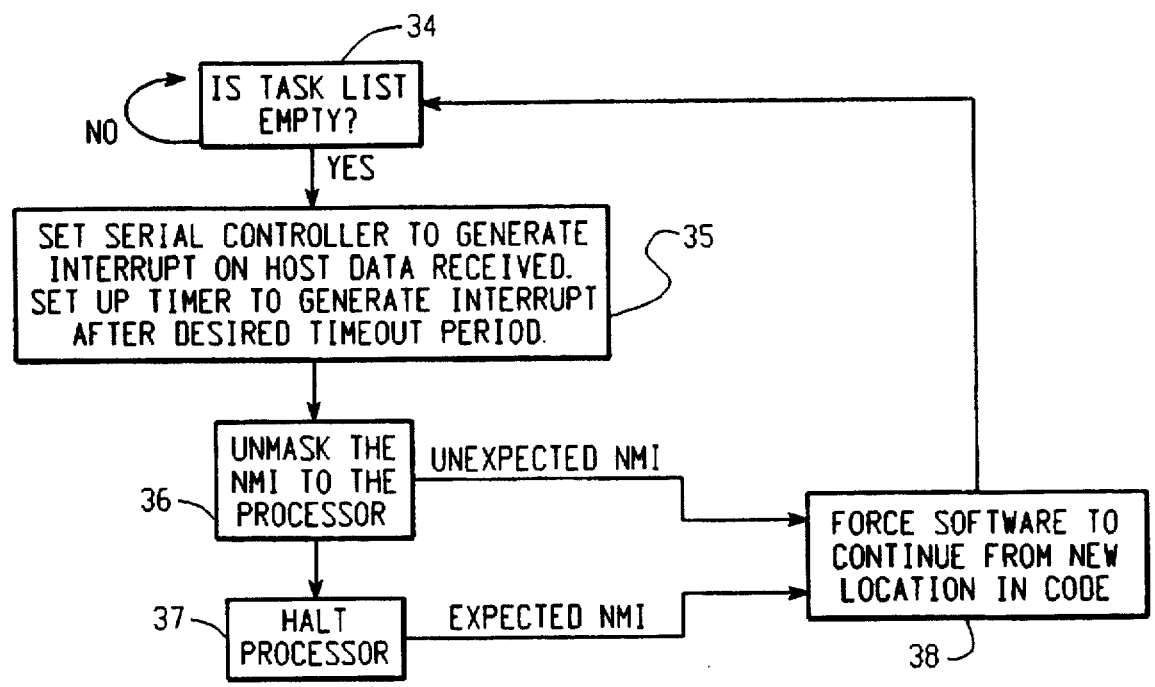
FIG. 2 is a block diagram of the operation of the interrupt handler for the power management hardware.

In order to "wake up" the microprocessor, and through the microprocessor the digital signal processor, a programmable timer is set such that it produces an output pulse no the processor after the expiration of a selectable, predetermined time period. As seen in FIG. 2 in block (34), the timer is set when in is determined that the microprocessor does not have any tasks left to be completed in its task list and thus the determination is made that the microprocessor and the digital signal processor can be permitted to be put in their lowest power, or fully idle, states. Although in the preferred embodiment the microprocessor when directed to shut down first shuts down the digital signal processor before shutting itself down, it would be appreciated by one of ordinary skill in the art that the digital signal processor could first determine that it is able to shut down, and then inquire whether the microprocessor is able to shut down.

Communication System

The host data processing system communicates with the circuit at a very high rate, exceeding 9600 bits per second. When the host first starts communicating, the circuit has only about 1 ms to wake up, otherwise information would be lost. By using a serial communications controller (19) with a built in memory, it is possible to store the first few characters external to the processor. This allows the processor over four times longer to wake up and respond to the host.

Masking the Non-Maskable Interrupt

If the external serial communications controller were connected directly to the non-maskable interrupt of the processor, inefficient operation would result as an non-maskable interrupt requires longer to service than a standard interrupt. To overcome this problem, the non-maskable interrupt is connected through standard logic cells to provide a masking operation. By enabling the processor to mask the non-maskable interrupt, faster response time, reduced processor 'on' time in a fully-powered state, and lower power consumption result. Masking a non-maskable interrupt represents an idea that is not known to be within the prior art for the purposes of power saving.

Power Management Software Description

Software contains several key components, the most important of these is the task list. As suggested by FIG. 2, if the processor or associated circuitry is 'busy' with a task, it will be indicated by an entry in the task list. When the task list is empty the processor will enter the lowest power mode possible, and as seen in block (35) of FIG. 2, the serial controller is posted as a sentry to detect data communications so as to initiate an activating interrupt to the microprocessor to begin a wake-up cycle. Additionally, the timer associated with the serial communications controller (19) is set to initiate an output pulse that will also serve to wake-up the microprocessor prior to the initiation of the activating interrupt by the serial communications controller (19). In normal operation under this power management scheme, the processor spends about 5% of its time active, and 95% in the fully idle, lowest power mode.

One of the key elements in the software flow is that the interrupt handler in normal software would return to the instruction following the point an which the interrupt occurred. However, there is a window of vulnerability when using a maskable non-maskable interrupt. If an interrupt occurred at the exact instant that the interrupt is unmasked (unexpected non-maskable interrupt), and the interrupt handler was written in the standard way known in the art, it would return program execution to the instruction following where the interrupt occurred, which in this case would be a halt instruction. The processor would therefore be caused to halt execution by an interrupt, when what is desired is an interrupt that initiates execution. As seen in blocks (36), (37) and (38) of FIG. 2, the present invention incorporates modifications to the internal working of the processor by taking control of the program stack and forcing the code to execute from a specific known state that would be 'safe' after either an expected, or unexpected non-maskable interrupt. The unexpected benefit of implementing the above power management scheme utilizing a circuit that includes a serial communications controller (19) to provide a masked nonmaskable interrupt is that the power consumption of the serial communications controller (19) is outweighed by the power savings resulting from its use and that the overall power requirements of the microprocessor and the digital signal processor are reduced by a factor of more than 6.

Soft "Turn-on" Operation

The function of the soft "turn-on" circuit is to allow the host to turn the radio on and off with a minimum of extra circuitry. The soft turn-on is required to be rugged in the sense that it should not accidentally turn on or off when power-glitches occur. The quiescent power dissipation of the circuit needs to be kept as low as possible, especially when the circuit is in its off state. The circuit is also required to operate at very extreme voltages, such as when the system battery is substantially discharged, or overcharged, with the circuit most importantly maintaining correct operation of the radio modem by keeping the radio off or on as desired. Standard off-the shelf components and circuits generally have undefined operation below a few volts making them unsuitable for this purpose.

Figure 3:
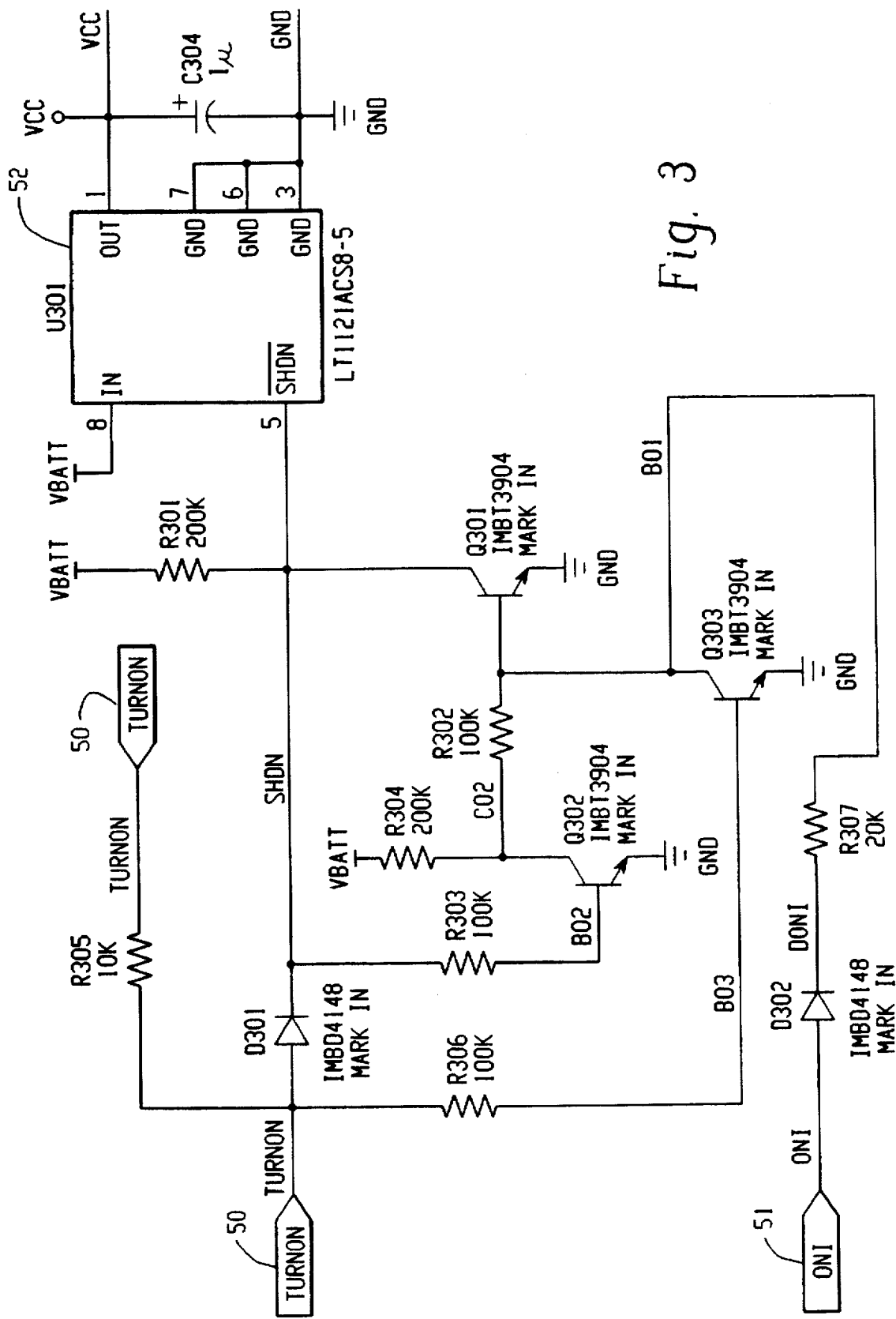
FIG. 3 is a schematic of circuitry that provides a "soft turn-on".

The circuit used to achieve the above goal is shown in FIG. 3. The circuit is similar in operation to an RS flip-flop that satisfies the following operational constraints:

1) When the host 'Turnon' signal (50) is active, power is supplied to the radio modem through microprocessor power supply (52) which is preferably a LT1121ACS8-5 manufactured by Linear Technology. As can be seen in the timing diagram FIG. 4, a period of time transpires from the time the Turnon signal is initiated and the power supply is active.

2) When the on indication ('ONI') signal (51) is active while 'Turnon' (50) goes from active to inactive, power remains supplied until certain housekeeping functions are completed and it is determined that the transition of the Turnon signal (50) is not a transient pulse. Also as FIG. 4 illustrates, the ONI signal remains in an inactive state until the radio modem has completed its boot cycle and remains active until the expiration of the housekeeping cycle.

3) When the host 'Turnon' signal (50) is inactive, power will only be removed from the circuit if 'ONI' is also inactive. This is illustrated as well on FIG. 4 at the point where the housekeeping cycle ends.

Figure 4:
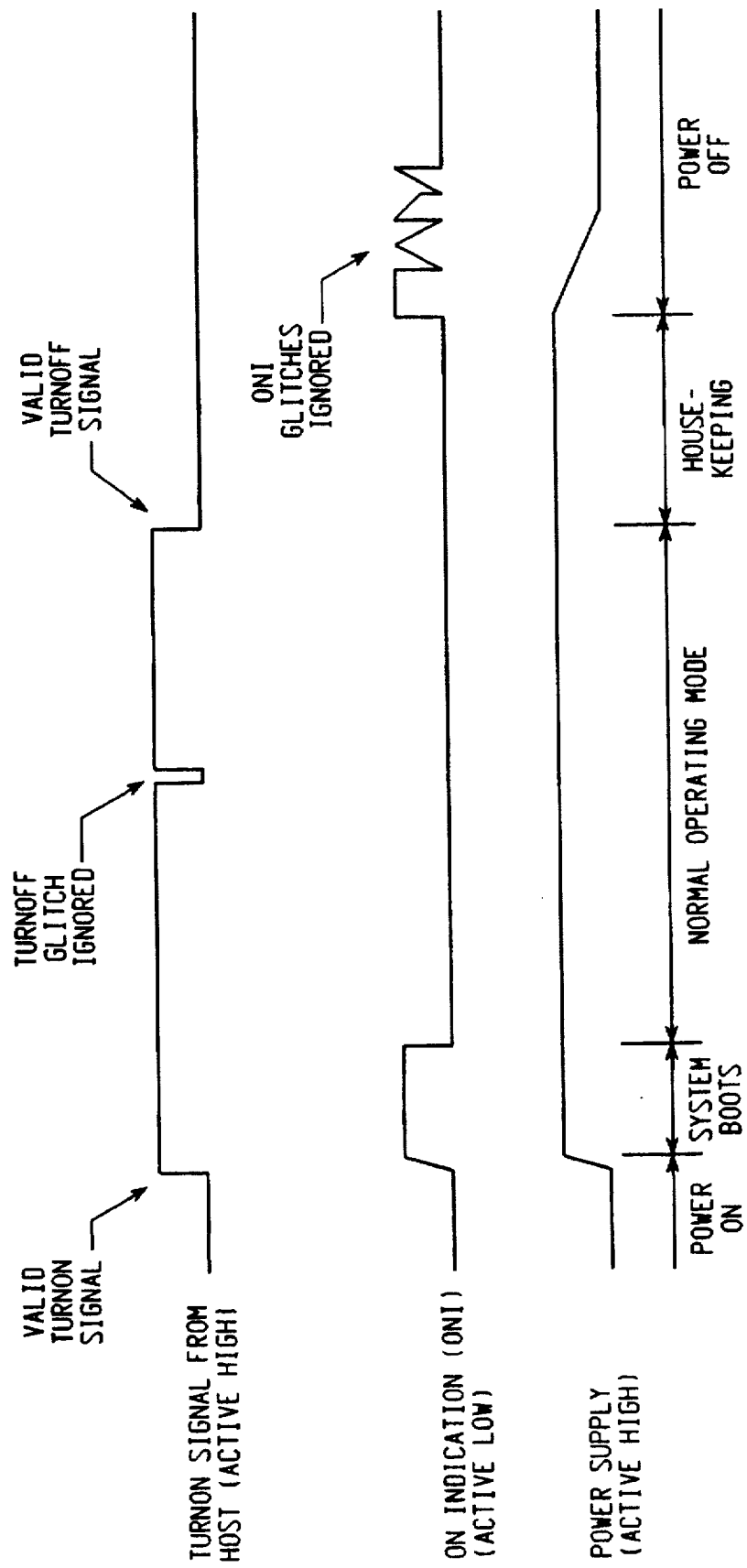
FIG. 4 is timing diagram for the soft turn-on function.

4) A brief transition of 'ONI' from inactive to active while 'Turnon' is inactive will not cause power to be applied to the circuit as also displayed in FIG. 4.

Although the present invention has been described and illustrated in detail, the description is meant to be illustrative and not limiting the spirit or scope of the invention, which is limited and defined with particularity only by the terms of the appended claims.

We claim:

1. A circuit for minimizing power consumption in a radio modem that includes a digital signal processor and a microprocessor for providing overall control of the radio modem, wherein the microprocessor includes a nonmaskable interrupt signal input and at least one standard interrupt signal input and wherein power consumption is minimized by placing the microprocessor in an fully inactive mode when it is not needed to process a data transmission from a host system associated with the radio modem or to process an external signal received by the radio modem, the circuit comprising:

(a) deactivating means for placing the microprocessor in the fully inactive mode;

(b) a serial communications controller, connected to the microprocessor, for detecting communications from a host system associated with the radio modem and for generating a first activating interrupt signal if the communications are received while the microprocessor is in the fully inactive mode and for generating a first nonactivating interrupt signal if the microprocessor is in an active mode;

(c) timing means associated with the serial communications controller for producing an output pulse to the microprocessor after a predetermined period of time has elapsed from a point in time that the means for deactivating placed the microprocessor in the fully inactive state, wherein the output pulse is transmitted as a second activating signal if the microprocessor is fully inactive and as a second nonactivating signal if the microprocessor is active; and (d) means for masking from the nonmaskable interrupt input to the microprocessor a received one of the first nonactivating interrupt signal or the second nonactivating interrupt signal.

\* \* \* \* \*